(12) United States Patent
Cobb (10) Patent No.: US 8,051,907 B2
(45) Date of Patent: Nov. 8, 2011

(54) DOWNHOLE SEPARATOR

(76) Inventor: Delwin E. Cobb, Houston, TX (US)

( * ) Notice: Subject to any disclaimer, the term of this patent is extended or adjusted under 35 U.S.C. 154(b) by 0 days.

(21) Appl. No.: 13/035,422

(22) Filed: Feb. 25, 2011

(65) Prior Publication Data

US 2011/0162833 A1    Jul. 7, 2011

Related U.S. Application Data

(63) Continuation of application No. 12/354,452, filed on Jan. 15, 2009, now Pat. No. 7,909,092.

(51) Int. Cl.
*E21B 43/08* (2006.01)
*E21B 43/38* (2006.01)

(52) U.S. Cl. .................. 166/105.1; 166/105.5; 166/106; 166/191; 166/227; 166/265; 96/155; 96/219

(58) Field of Classification Search ............... 166/105, 166/105.1, 105.5, 106, 191, 227, 265, 369; 96/155, 219; 210/512.1, 512.2, 788
See application file for complete search history.

(56) References Cited

U.S. PATENT DOCUMENTS

| | | | |
|---|---|---|---|
| 2,290,127 A | 7/1942 | Johnson | |
| 2,837,032 A | 6/1958 | Horsting, Sr. | |
| 3,408,949 A * | 11/1968 | Hart, Jr. | 417/126 |
| 4,148,735 A | 4/1979 | Laval, Jr. | |
| 4,900,433 A | 2/1990 | Dean et al. | |
| 5,314,018 A | 5/1994 | Cobb | |
| 5,711,374 A | 1/1998 | Kjos | |
| 6,089,322 A * | 7/2000 | Kelley et al. | 166/370 |
| 6,189,613 B1 | 2/2001 | Chachula et al. | |
| 6,216,788 B1 | 4/2001 | Wilson | |
| 6,234,248 B1 | 5/2001 | Knight | |
| 6,277,286 B1 | 8/2001 | Sontvedt et al. | |
| 6,322,331 B1 | 11/2001 | Swatek et al. | |
| 6,343,653 B1 | 2/2002 | Mason et al. | |
| 6,394,183 B1 | 5/2002 | Schrenkel et al. | |
| 6,619,390 B1 | 9/2003 | Kellett, III | |
| 6,723,158 B2 | 4/2004 | Brown et al. | |
| 7,703,509 B2 | 4/2010 | Ford | |
| 7,909,092 B2 * | 3/2011 | Cobb | 166/105.1 |
| 2002/0134554 A1 | 9/2002 | Schrenkel et al. | |

* cited by examiner

*Primary Examiner* — George Suchfield
(74) *Attorney, Agent, or Firm* — Browning & Bushman P.C.

(57) ABSTRACT

The desander (10) for positioning downhole includes a generally tubular desander body (16) and a generally sleeve-shaped vortex body (39, 94). The desander with a seal or packer may be positioned in a well below the casing perforations. The desander with an ESP may be used with gas separator (60), which may include a seal (24) for positioning above the producing formation. The separator (60) may be used independent of the desander for some applications.

18 Claims, 12 Drawing Sheets

DOWNHOLE SEPARATOR

CROSS REFERENCE TO RELATED APPLICATION

This application is a continuation of U.S. Non-provisional application Ser. No. 12/354,452 filed Jan. 15, 2009 now U.S. Pat. No. 7,909,092, the disclosure of which is incorporated herein by reference for all purposes.

FIELD OF THE INVENTION

The present invention relates to a downhole tool used to separate sand and similar solid particles from a fluid stream before the fluid is pumped to the surface. This invention may also involve a gas separator to separate gas from liquids.

BACKGROUND OF THE INVENTION

Various types of pumping systems have been devised to pump fluid from a downhole formation to the surface. Solid particles, such as sand, and/or gas bubbles may significantly detract from the efficiency of the pump, and may lead to pump damage. Various types of desanders and gas separators have been devised for removing sand or gas from downhole fluids before entering the pump.

U.S. Pat. No. 6,234,248 discloses well production apparatus which includes a gas fluid separator in the casing of the well. A fluids composition sensor and transmitter are also provided. U.S. Pat. No. 6,723,158 discloses another type of gas separator with a single large gas exit port and a single large fluid inlet. U.S. Pat. No. 6,322,331 discloses a system with a centrifugal pump driven by a motor. The bypass tube is used for workovers and does not require pulling the tubing. U.S. Pat. No. 6,277,286 discloses a system for separating lower density fluids from a higher density fluid. The separated fluids are removed through separate outlets. U.S. Pat. No. 5,314,018 discloses a desander which includes a spiral guide such that helical motion is imparted to the well fluids and solid particles settle downwardly within the vortex chamber.

The disadvantages of the prior art are overcome by the present invention, which discloses an improved downhole desander and method of operating a desander. An improved gas separator and method of operating a gas separator are also disclosed.

SUMMARY OF THE INVENTION

In one embodiment, a desander for positioning downhole to separate fluid from other components prior to pumping the fluid to the surface includes a generally tubular desander body for connection to a production tubing string, with the desander body having one or more fluid inlets positioned circumferentially about the desander body. The generally sleeve-shaped vortex body is positioned within a desander body, with the vortex body extending from above the plurality of fluid inlets to below the plurality of fluid inlets. The vortex body has one or more tangential inlet ports spaced circumferentially about the vortex body for imparting a vortex flow to the fluid entering the vortex body. The vortex body extends axially from above the inlet ports to a generally conical vortex body interior surface with a reduced cross-sectional flow area compared to a cross-sectional flow area adjacent the inlet ports. A lower end of the vortex body has a discharge port, such that solid particles pass through the discharge port in the lower end of the vortex body. The formation fluids flow upward through an upper end of the vortex body and into the production tubing string. In one embodiment, a seal supported on the desander body seals between an exterior surface of the desander body and an interior surface of a downhole casing. Multiple vortex bodies may be positioned in parallel within the tubular desander body.

In another embodiment, a downhole gas separator is provided for separating gas from downhole formation fluids prior to pumping the formation fluids down to the desander then up to the surface. The gas separator includes a generally tubular body having a fluid inlet. In one embodiment, an elongate tube has a lower end in fluid communication with the annulus below the seal and an upper end for exhausting gas to a reduced pressure region less than pressure at the lower end of the tube.

These and further features and advantages of the present invention will become apparent from the following detailed description, wherein reference is made to the figures in the accompanying drawings.

DETAILED DESCRIPTION OF PREFERRED EMBODIMENTS

Figure 1:
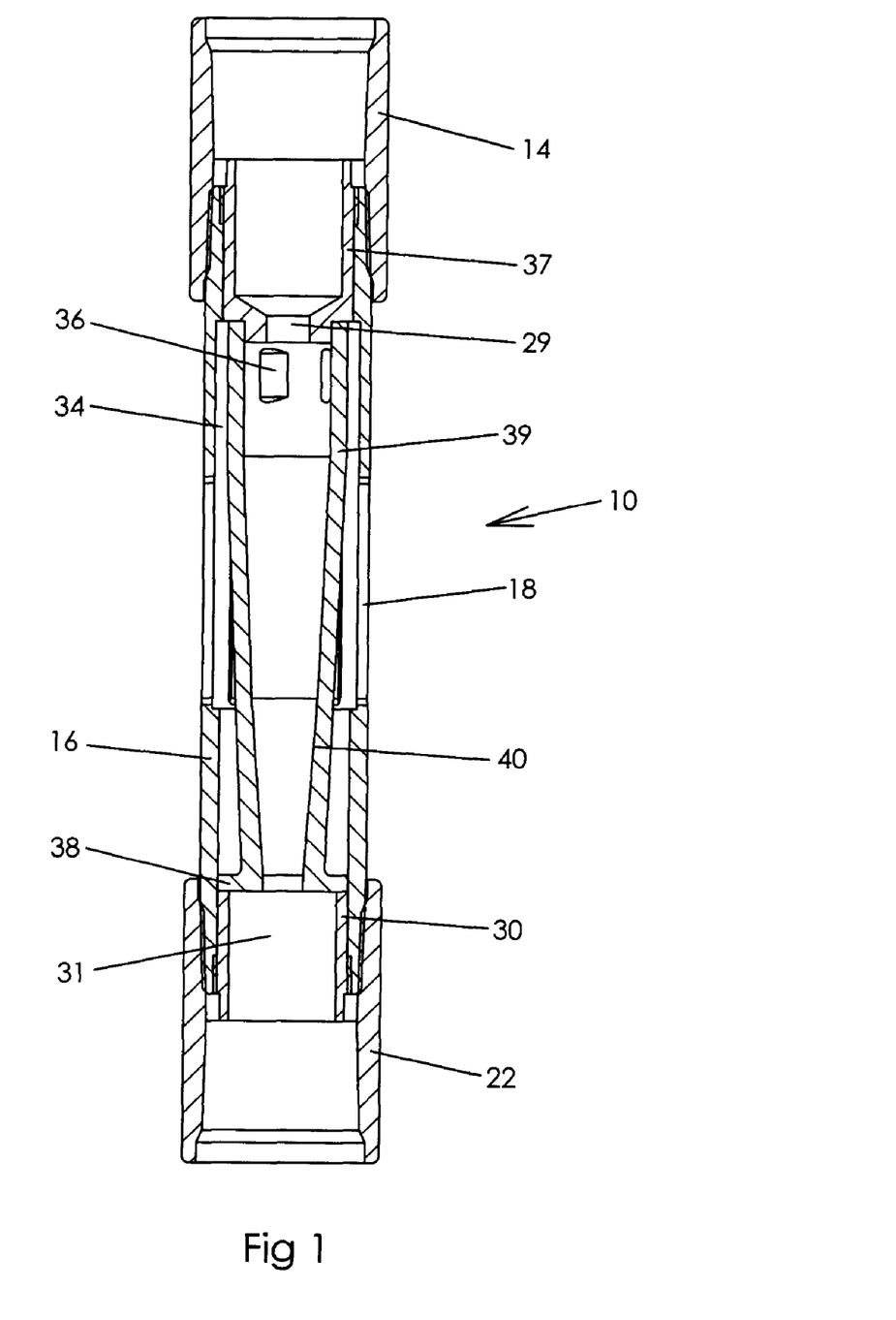
FIG. 1 illustrates one embodiment of a desander.

FIG. 1 illustrates a desander 10 which comprises outer desander body 16 and coupling 14 for interconnecting a pup joint with the desander body 16 and an inner vortex body 39. The desander body 16 includes the plurality of circumferentially spaced fluid inlets 18. The upper end of the desander body is adapted for connection to the pup joint, or may be directly connected to a production tubing string.

Body 16 is threaded at its upper end for interconnection with the coupling 14, and is threaded at its lower end for interconnection with coupling 22. An annular gap 34 exists between an interior of the body 16 and exterior of the vortex body 39. Flow enters through fluid inlets 18 and flows upward through the one or more ports 36 in the vortex body 39. End port 36 may have a generally rectilinear configuration for high flow rates and sound structural integrity for the vortex body. Solids are forced radially outward within the vortex body and fall into the mud anchor, while liquids flow upward and through upper port 29. The body 39 has a frustoconical inner surface 40, which when combined with the tangential ports 36, produces a vortex flow in the vortex body. Threaded member 30 has a central fluid outlet 31, and is threaded to the lower end of the body 16. Solid particles pass through the discharge port 31, and formation fluids flow upward through the port 29 and into the production tubing string. The vortex body 39 may be centered in the body 38 by lower flange 38, which may engage an interior surface of body 16. An upper retainer 37 with port 29 therein similarly centers the upper portion of vortex body 39 within the tubular outer body 16.

Figure 2:
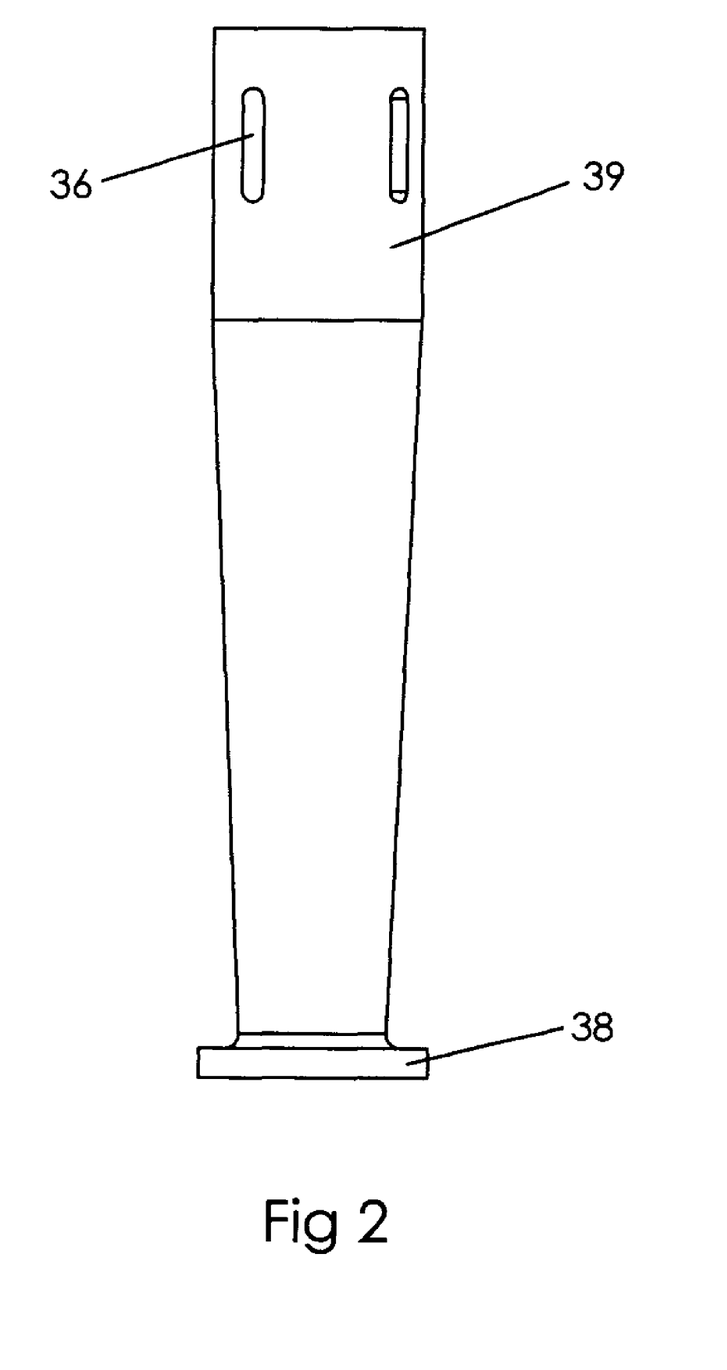
FIG. 2 is a pictorial view of the inner vortex body generally shown in FIG. 1.
Figure 3:
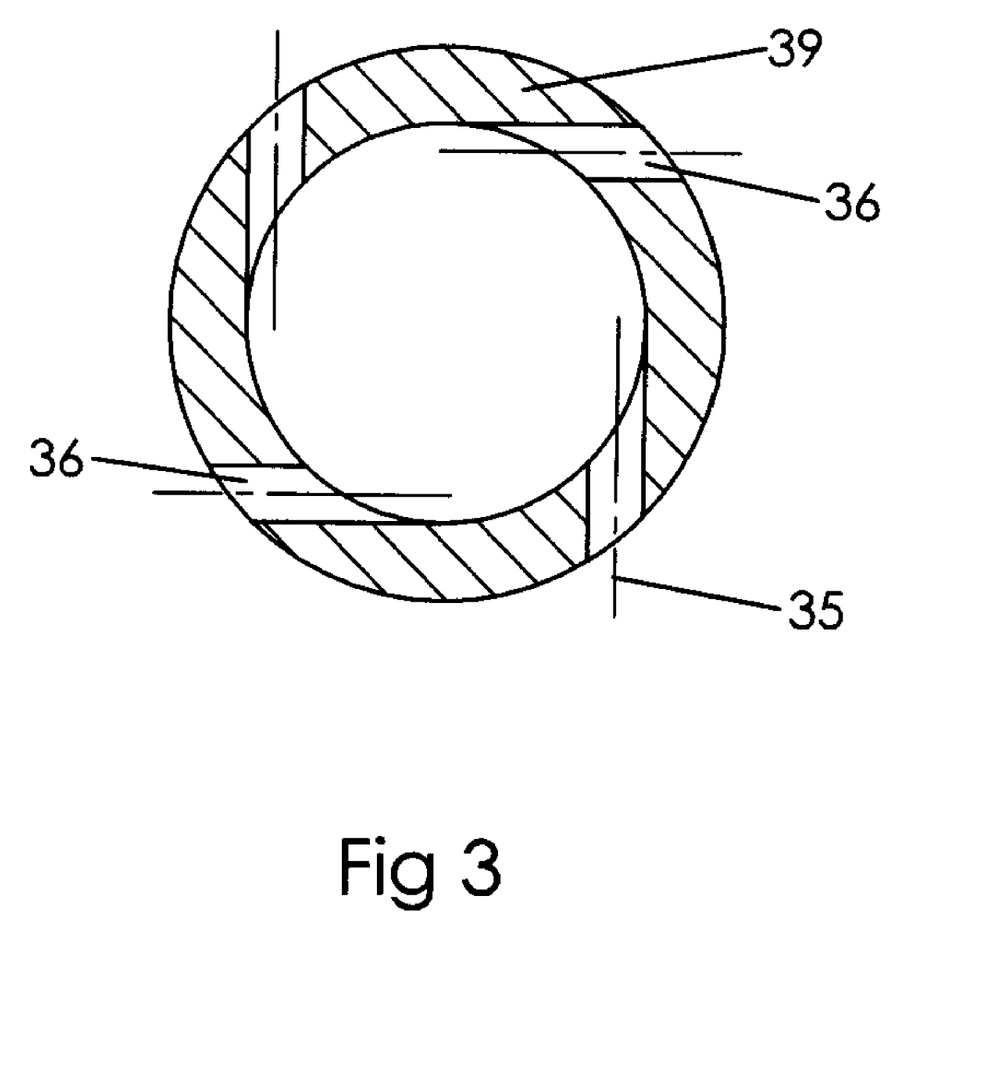
FIG. 3 is a cross-sectional view through tangential inlet ports in the vortex body.

For the embodiment shown in FIGS. 1, 2, and 3, the inlet ports 18 in the desander body may pass fluid inwardly from the casing annulus into the vortex body in substantially a radial direction. FIG. 2 is a pictorial view of the vortex body shown in FIG. 1. As shown in FIG. 3, each of the plurality of fluid inlets 36 in the vortex body 39 has a central axis 35 substantially parallel to and adjacent the interior surface of the vortex body, thereby imparting a substantially tangential flow to fluid entering the vortex tube or body. The FIG. 3 embodiment includes four circumferentially spaced inlet ports 36 each positioned about the vortex body 39.

Figure 4:
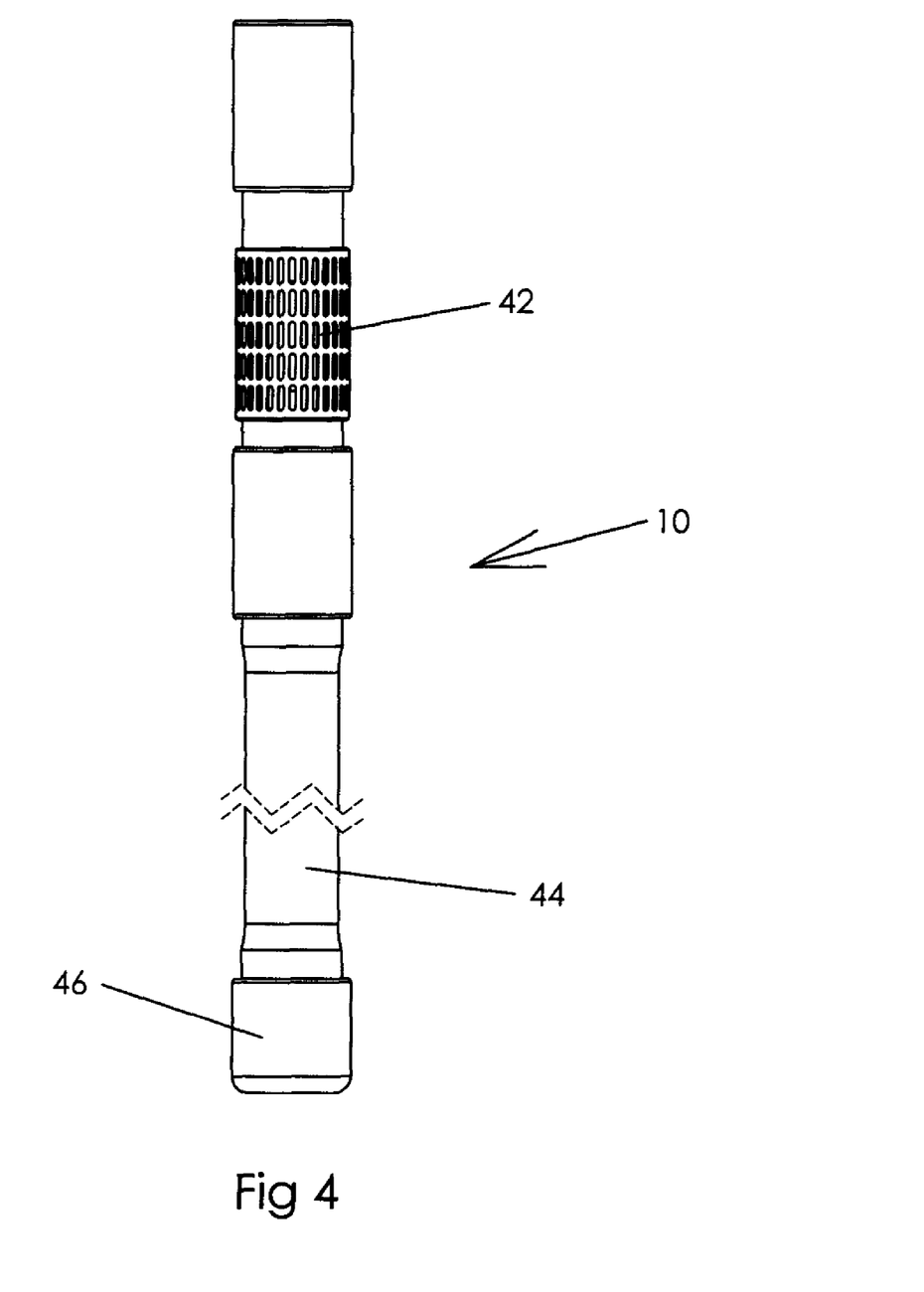
FIG. 4 illustrates another embodiment of a desander with a inlet strainer and a mud anchor.

FIG. 4 discloses another variation of a suitable desander tool 10, wherein a filter or strainer 42 having a generally sleeve-shaped configuration is positioned about the ports 18 for filtering large solids from the fluid before entering the interior of the tool. FIG. 4 further illustrates a mud anchor 44 with a lower plug 46 for collecting solids which pass downward through the vortex body 39.

Figure 5:
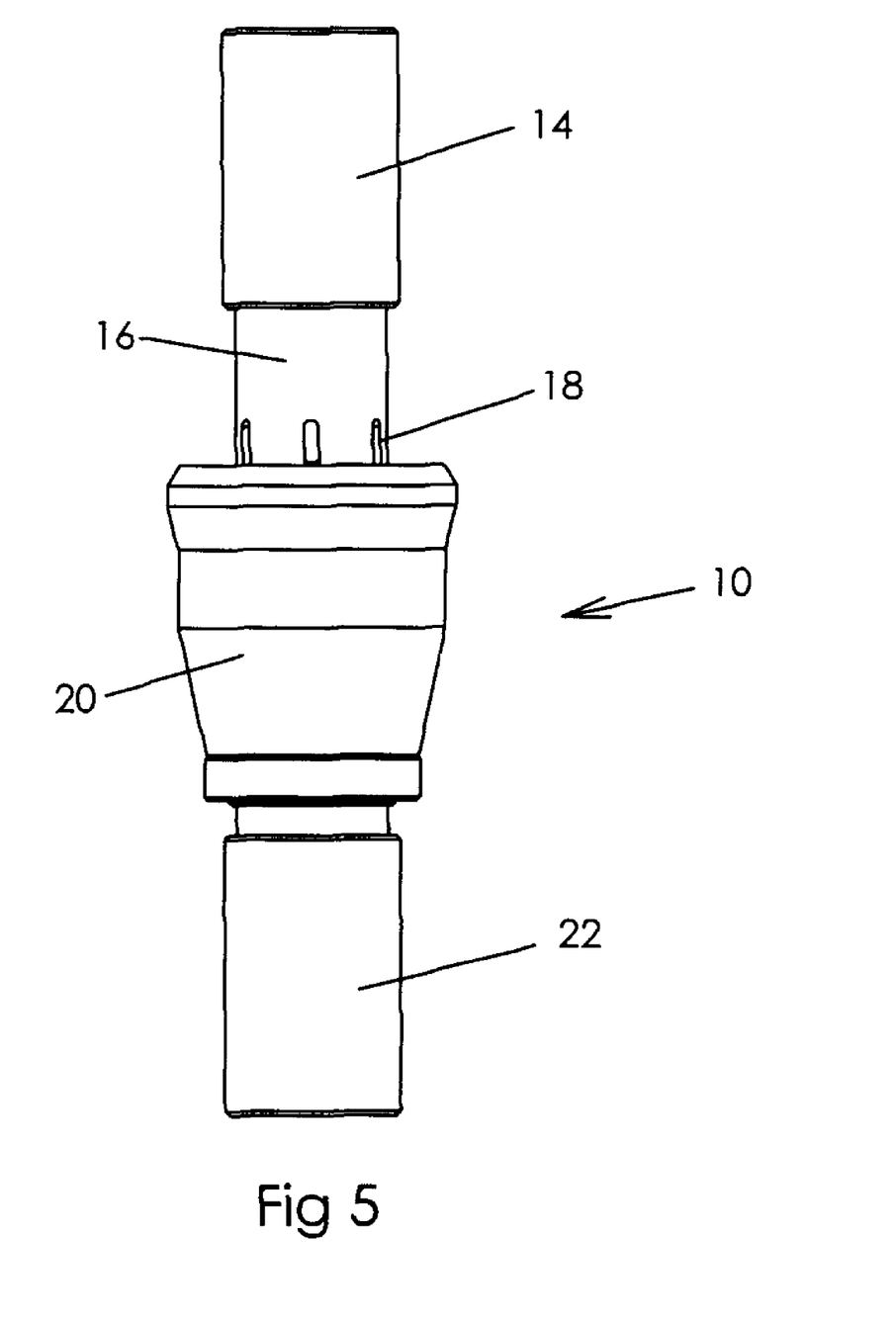
FIG. 5 is a pictorial view of another embodiment of a desander with a seal for sealing with a casing.

FIG. 5 illustrates another embodiment of a desander 10. A cup shaped seal body 20 may be preferred for some applications, with the seal preferably providing a generally frusto-conical configuration with an apex below the seal. Fluid pressure above the seal thus tends to force the edges of the cup seal 20 radially outward and into sealing engagement with the interior of the casing. The seal 20 may be positioned close to but below the inlets 18 to minimize the likelihood of solids piling up above the seal and sticking the desander in the well. Sand that flows down the casing annulus will thus flow into the desander with the liquid.

Still referring to FIG. 5, the generally sleeve-shaped vortex body 39 (not shown) is positioned within the body 16, and has a central axis generally aligned with the central axis of the desander body, as shown in FIG. 1. A cup-shaped packer 20 is run below the casing perforations. The desander 10 as shown in FIG. 5 is particularly suitable for positioning in a well below the casing perforation. Other downhole equipment, such as a pump anchor, may be suspended below the desander body 16, as explained below. A mud anchor may not be needed, but if used may be positioned below the desander for receiving solid particles. A mud anchor minimizes the danger of sticking since the sand will not surround the mud anchor.

A significant advantage of the desander arrangement as disclosed herein is that an unintended circumferential cut in the vortex tube or body allows all the components to be retrieved to the surface with the undamaged body 16. The risk that components of the desander might drop in the well if sand cuts the vortex tube is substantially reduced or eliminated. The vortex body 39 thus protects the larger diameter, more expensive outer body 16 from destruction and abrasive wear. If the vortex body is cut by sand or otherwise destroyed, the cutting action stops before the outer body 16 is damaged. If this occurs, sand will no longer be stopped from passing upward through port 29 as shown in FIG. 1, but the destroyed parts will not plug the liquid flow to a downhole pump.

Figure 6:
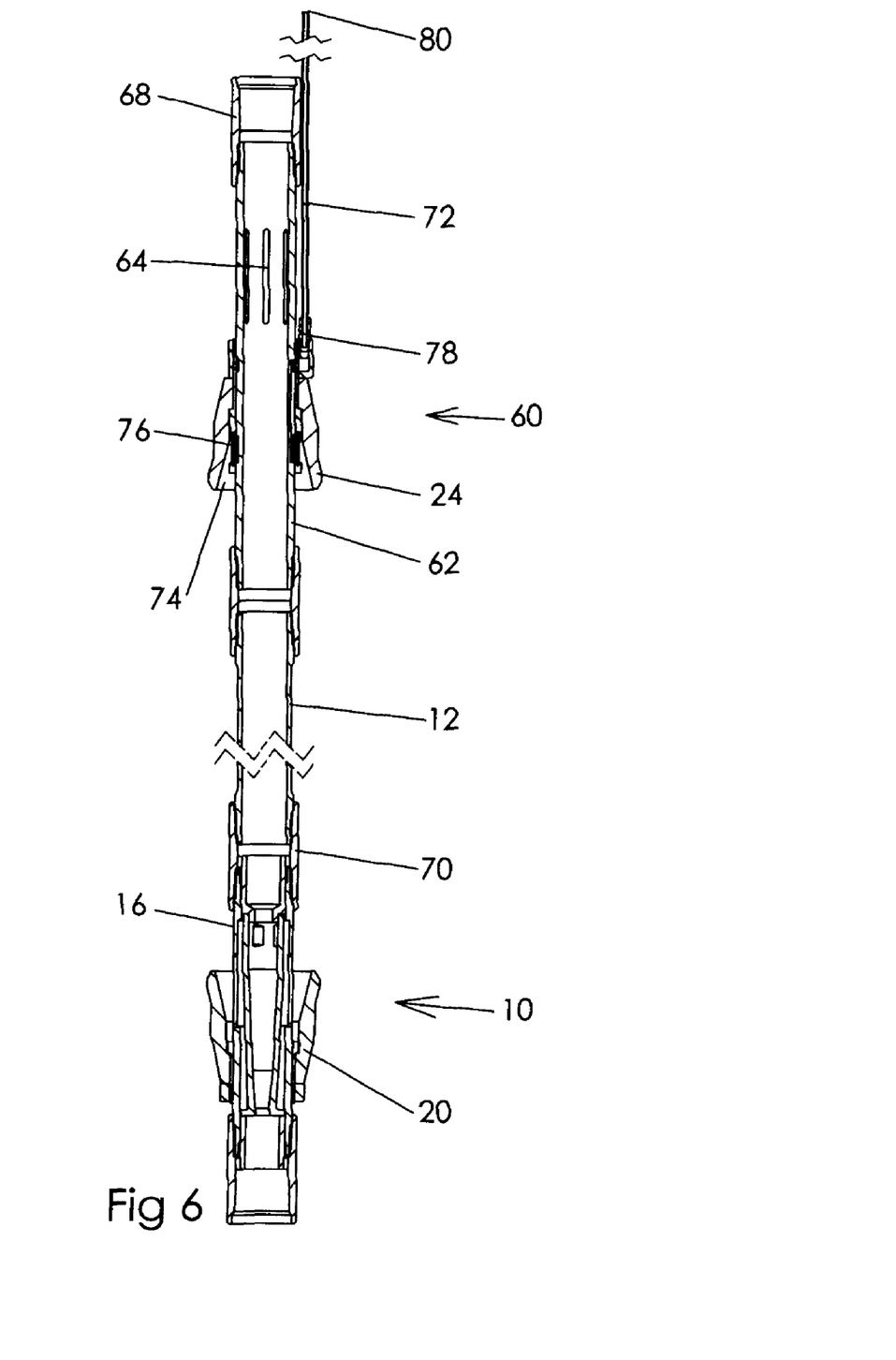
FIG. 6 illustrates yet another embodiment of the invention with a gas separator positioned above a desander.

Referring now to FIG. 6, a downhole separator for use with an electrical submersible pump is shown consisting of a desander 10 as discussed above, with seal 20 sealing between the casing and the desander body 16. Coupling 70 interconnects the desander 10 to production tubing 12, which is coupled to body 62 of a gas separator unit 60, which carries the seal 24 which similarly seals between the casing and the body 62. Fluids from the producing formation conventionally enter the interior of the casing (not shown) through perforations, with fluid entering the casing between the upper seal body 24 and a lower seal body 20. The FIG. 6 embodiment is primarily intended for use with a pump driven by an electric submersible motor, such as an ESP.

Figure 10:
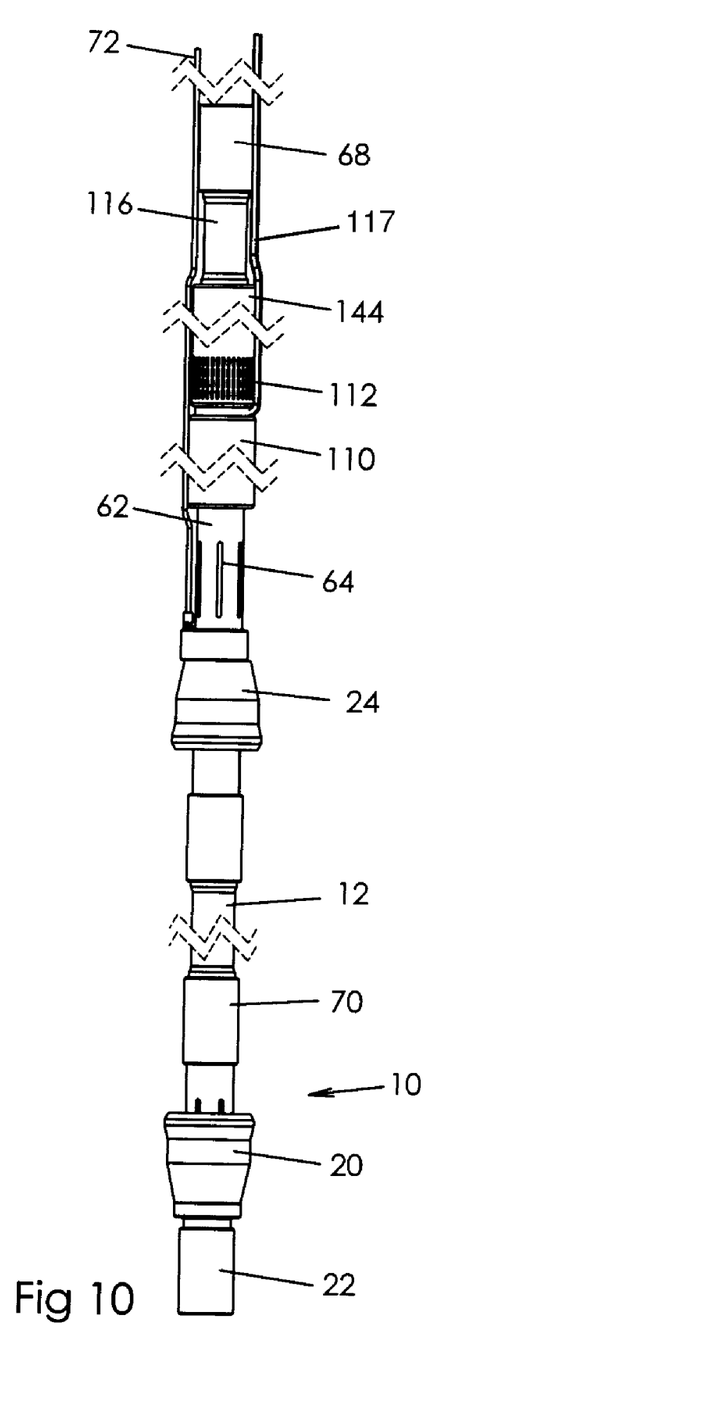
FIG. 10 depicts another embodiment of a desander below an ESP.

As shown in FIG. 6, the gas separation unit 60 receives fluid through a lower end of the tubular body 62, and discharges fluid to the annulus exterior of tube 62 through discharge port 64, which are located above the seal 24 and below the inlet to the pump. Coupling 68 interconnects the body 62 to the electric pump motor as shown in FIG. 10, so that fluid enters the pump from the annulus interior of the casing and above the seal 24.

Fluid is thus drawn downward to the desander 10 that is preferably positioned about 10 feet or more below the casing perforations, while gas inherently moves upward and is trapped in the annulus below the seal 24. The tubular 12 preferably has a reduced diameter to minimize the flow rate in the annulus and thus increase upward gas migration. The interior cavity 74 in the seal thus receives gas, with strainer or filter 76 preventing debris from migrating upward past the seal 24 and to the coupling 78. Coupling 78 in turn is connected to small diameter tube 72, which extends upward so that its upper end is conventionally 20 feet or more above the inlet to the electric submersible pump.

Figure 11:
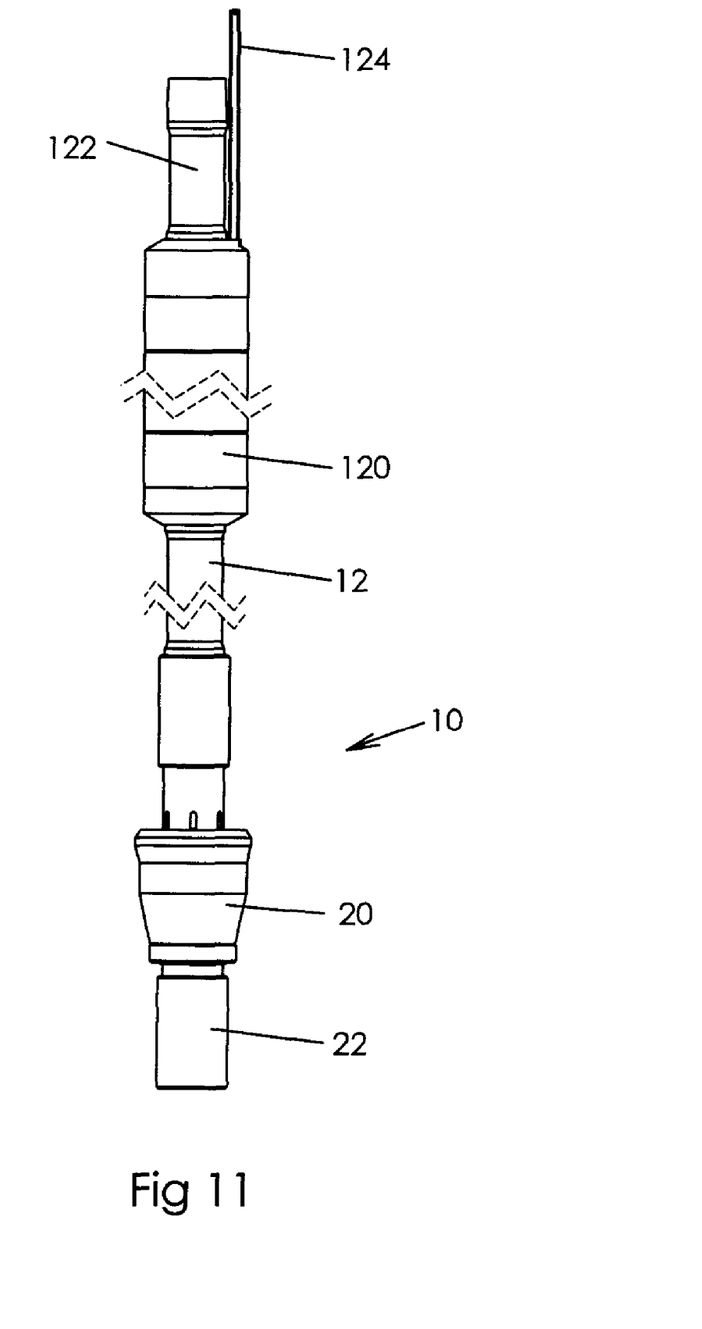
FIG. 11 depicts a desander with the ESP positioned within a shroud.

The upper end of the tube 72 is positioned sufficiently high from the lower end of the tube so that the fluid in the cavity 74 and thus the tube inlet creates a sufficient head differential to pass gas upward through the tube 72 and discharge gas above the inlet to the pump, so that gas desirably does not enter the pump. In the event that a shroud is used, as shown in FIG. 11, the tubular body 16 and attachment components are not needed. As shown in FIG. 11, the desander 10 includes a packer body sealed to the production tubing 12 and sized for sealing with the interior of downhole casing. In this case, an ESP shroud 120 encloses the ESP, with the top of the shroud being connected to a pup joint 122 for fluid communication with a production tubing string. Electric cable 124 extends downward from the surface into the shroud, and powers the ESP motor.

Figure 12:
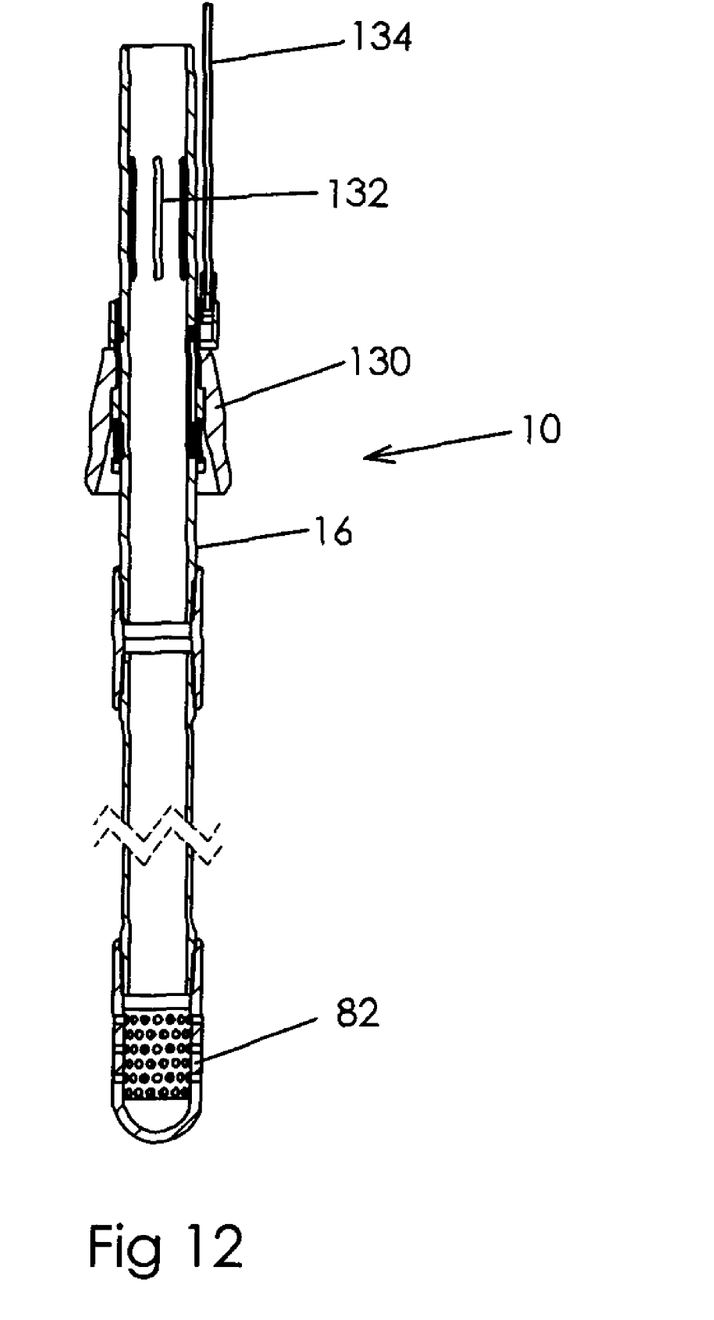
FIG. 12 depicts a desander with a lower perforated nipple.

A principle feature of the gas separator disclosed herein involves the benefit of removing gas from the annulus so that it does not enter the pump inlet. When the pump motor is positioned below the pump, as is conventionally the case for an ESP, the pump inlet is going to be in fluid communication with this annulus. Gas separated by the gas separator rises upward to a position above the pump inlet while liquids enter the interior of the separator from below, regardless of whether a desander is provided. If a desander 10 is not used with a conventional gas separator, a perforated inlet nipple 82 as shown in FIG. 12 may be positioned several feet below the casing perforations to form a natural gas separator. FIG. 12 also depicts cup-type packer 130 positioned below the exit ports 132, with vent line 134 having a lower end in fluid communication with the cavity between the packer 130 and the tubular 16, as in the FIG. 6 embodiment, with the upper end of the tube being positioned above the inlet to the pump. A high-capacity gas separator alternatively may be used instead of nipple 82, and could be positioned higher in the well with much larger pumping rates.

The desander with outer body seal as shown in FIGS. 5 and 6 may be run below the casing perforations in a gassy well to produce liquid free of both sand and gas to the ESP. An upper seal or packer may be run below the ESP and above the perforations. The gas that collects in the casing annulus below the upper seal may flow up past the ESP inlet ports in the gas tube, as shown in FIG. 6. The gas tube may be omitted if the ESP has a built in gas separator, or if the gas flow is small enough for the ESP to handle the gas without a significant loss in pumping efficiency. The flow area for the gas past the upper seal should be relatively small to prevent excess liquid flow that carries solids, but large enough for the gas to escape.

Figure 7:
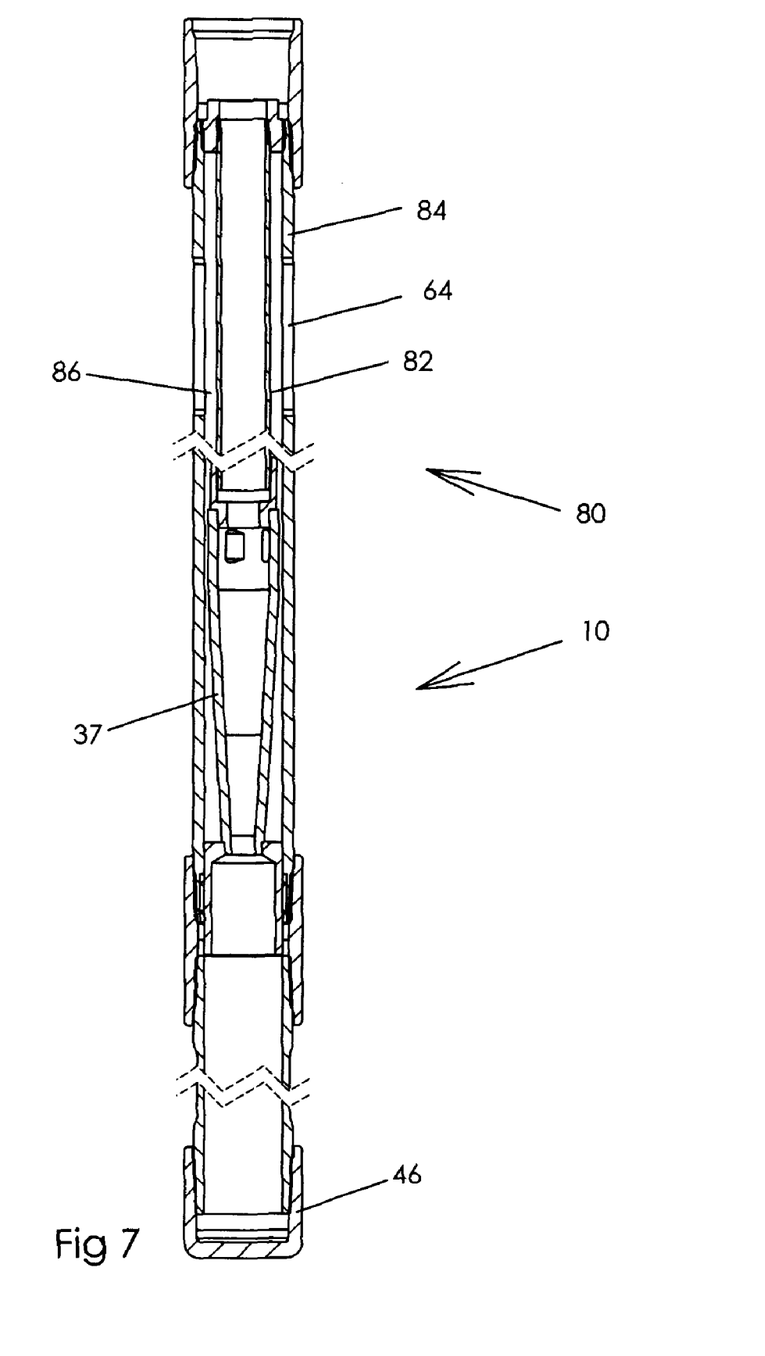
FIG. 7 illustrates another embodiment of the gas separator and desander.

The desander as shown in FIG. 7 may be run with a gas separator to remove gas and solids from liquid flowing to the pump. The liquid passes through the gas separator first, then flows down through the desander and then back up through a flow tube 82 to the pump.

In the FIG. 7 embodiment, liquid flows from the annulus 86 into the space between separator housing 84 and the flow tube 82, then flows down into the desander 10. Liquid passing from the desander 10 will continue upward through the flow tube 82 and to the pump, while gas in the annulus 86 moves upward and passes out through the inlet port 64 to the annulus surrounding the tool while liquids pass downward to the desander. The FIG. 7 embodiment thus illustrates an inexpensive form of a gas separator.

Referring now to FIG. 10, a desander 10 is shown with an upper cup-type packer 24 and a lower cup-type packer 20 each for sealing with the interior of a casing (not shown). Discharge port 64 and the tube 62 are shown in a manner similar to the FIG. 6 embodiment. Electric motor 110 is provided below the intake 112 to the pump 144, and a pup joint 116 and coupling 68 are provided for interconnection with a production tubing string. Fluid line 72 extends from the interior of the cup-type packer 24 to a position above the pump intake 112, and an electric cable 117 extends from the surface down to the pump 144 for powering electric motor 110. The gas separator as shown in FIG. 10 has particular utility when used with a beam pump driving a reciprocating rod, which provides intermediate rather than continuous flow from the well.

Figure 8:
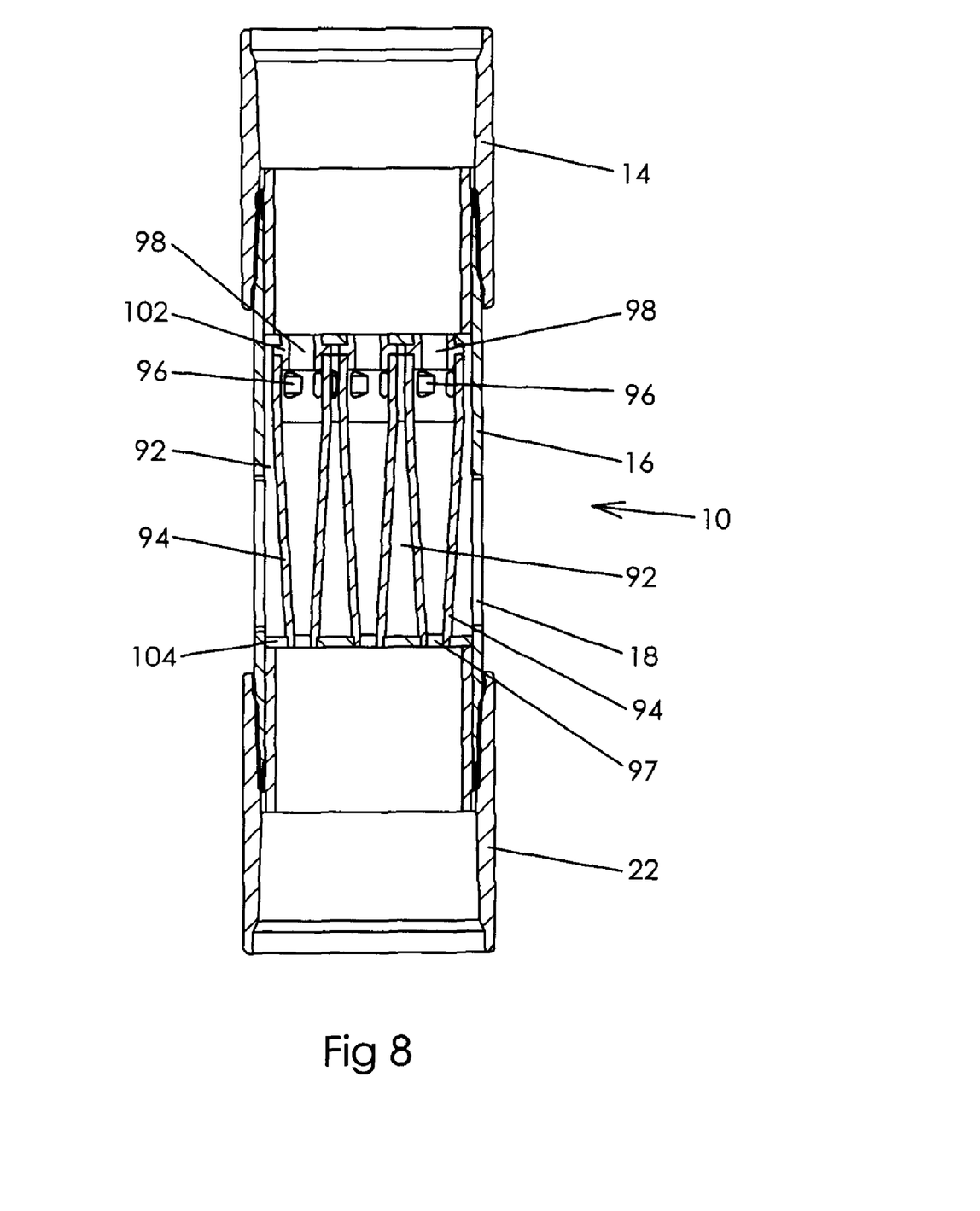
FIG. 8 illustrates a desander with multiple vortex tubes positioned within an outer body.
Figure 9:
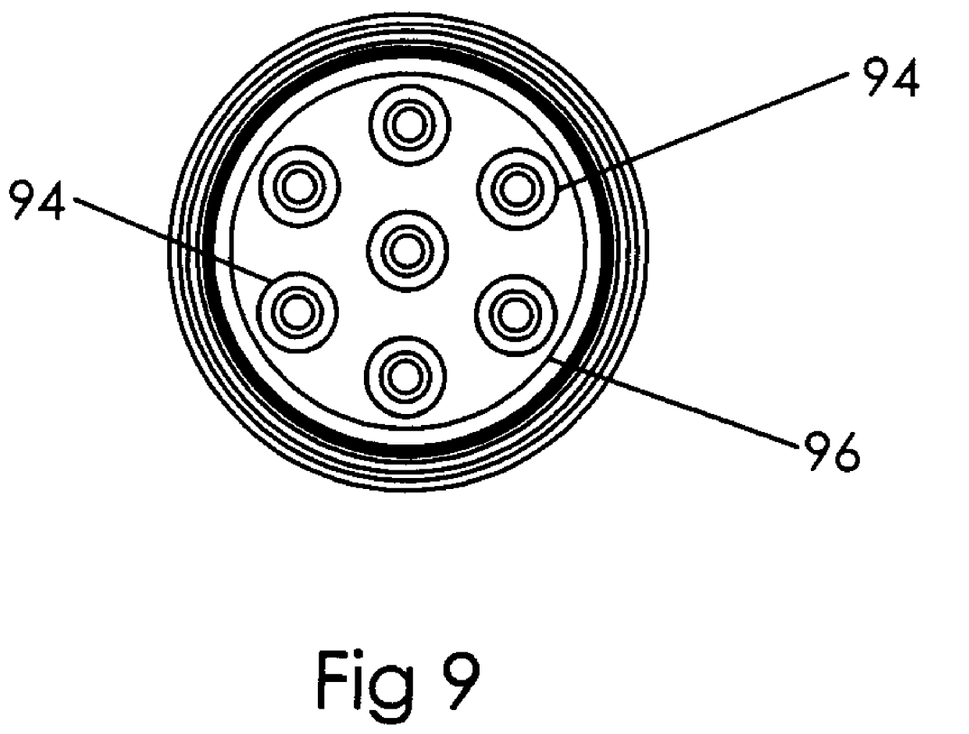
FIG. 9 is a cross-sectional view illustrating the position of the vortex tubes shown in FIG. 8.

Referring now to FIGS. 8 and 9, another embodiment of desander 10 is shown, comprising an outer tubular body 16 with input ports 18, an upper coupling 14, and a lower coupling 22. As shown in FIG. 8, fluid enters the outer tubular body through the openings 18, then travels upward in the space 92 between the plurality of vortex bodies 94 and between the interior of the tubular body 16 and the vortex bodies. Fluid enters each vortex body through the tangential ports 96 positioned about each vortex body, then travels downward through the frustoconical portion of each vortex body so that solids exit through lower port 97 at the lower end of each vortex body, while cleaned fluid passes upward through the opening 98 at the upper end of each vortex body, to be passed on to the pump. Each of the vortex bodies is thus arranged in parallel, and may be distributed throughout the interior of the tubular body 16, with the vortex bodies being arranged circumferentially about the interior of the tubular body 16, and optionally an additional vortex body centered within the tubular body.

By providing the desander with multiple vortex bodies, the vortex bodies may be relatively short in axial length, thereby reducing the overall length of the desander. Since a plurality of vortex bodies are provided for this embodiment, each vortex body may have a high efficiency, and together accommodate a large range of flow rates. The number of vortex bodies for this design may depend upon the application. Some applications may use less than seven vortex bodies as shown in FIG. 9, while other applications may use more than seven vortex bodies. As with the earlier embodiments, the vortex bodies 94 protect the outer tubular body 16 from destruction due to abrasive wear, since the cutting action stops before the outer tubular body is damaged. The vortex bodies may be machined, or may be cast in a wide range of sizes and materials.

With respect to the tangential input ports, the number of ports provided for each vortex body will depend on the anticipated flow rates. Two or more narrow, slotted ports may provide higher separator efficiencies than a single port. A single small circular port may be best, however, for low flow rates to avoid plugging. Pressure losses, flow velocities, and abrasive wear should be less when several small vortex bodies are used with a single larger diameter vortex body. A strainer as shown in FIG. 4 may also be used in the embodiment as shown in FIG. 8.

Either a left-hand release joint or a break-away sub may be provided if there is concern about the desander sticking, particularly if body seals are utilized below the casing perforations. The release joint or the break-away sub may thus allow separation so that, at a minimum, the pump may be returned to the surface with the tubular body 16 even if the outer desander body becomes stuck in the well.

When a seal is provided between the desander body and the casing, the seal is preferably located below the casing perforations. Various types of elastomeric seals may be used for sealing between an exterior surface of the body 16 and interior surface of casing in which the desander is positioned, as discussed below. This seal allows solids to enter the desander and fall into the casing cavity below the seal. The seal may be provided close below the desander inlets and run close below the casing perforation, so the sand will not accumulate around the assembly and stick the desander in the well.

The desander with the body seal as disclosed herein may be used with rod pumps, progressive cavity pumps, ESP shrouds, or ESP's with a casing seal above the casing perforations. Pump anchors for rod pumps or rotation preventers for progressive cavity pumps may be attached below the seal without sticking in the well. The tool may also serve as a natural gas anchor if it is positioned in the casing below the casing perforations. Small diameter pup joint above the assembly will improve a separation for large liquid flow rates.

Although specific embodiments of the invention have been described herein in some detail, this has been done solely for the purposes of explaining the various aspects of the invention, and is not intended to limit the scope of the invention as defined in the claims which follow. Those skilled in the art will understand that the embodiment shown and described is exemplary, and various other substitutions, alterations and modifications, including but not limited to those design alternatives specifically discussed herein, may be made in the practice of the invention without departing from its scope.

What is claimed is:

1. A downhole gas separator for separating gas from downhole formation fluids prior to pumping the formation fluids to the surface, comprising:

a generally tubular body having a fluid inlet for receiving formation fluid from a producing formation to a wellbore;

a seal supported on the tubular body for substantially sealing an annulus between an interior of a casing and an exterior of the tubular gas separator body, thereby trapping gas below the seal;

one or more flow ports through the tubular body and spaced above the seal for passing downhole fluids from the fluid inlet to the annulus and then to a fluid pump; and an elongate tube having a lower end in fluid communication with the annulus below the seal and an upper end spaced above the lower end for exhausting gas to a reduced pressure region less than pressure at the lower end of the tube.

2. A downhole gas separator as defined in claim 1, wherein the seal is a generally cup-shaped seal which extends radially outward and downward from the tubular body.

3. A downhole gas separator as defined in claim 1, further comprising:
a strainer positioned upstream from the lower end of the elongate tube for preventing debris from entering the elongate tube.

4. A downhole gas separator as defined in claim 1, further comprising:
a generally tubular desander body having a desander body axis, the desander body receiving the downhole formation fluids therein;
a generally sleeve-shaped vortex body positioned within a desander body, the vortex body having a frustoconical interior surface with a vortex body axis substantially aligned with the desander body axis and containing one or more substantially tangential inlet ports for imparting a vortex flow to the fluid within the vortex body.

5. A downhole gas separator as defined in claim 4, further comprising:
a seal supported on the desander body for substantially sealing between an exterior surface of the desander body and an interior surface of a downhole casing.

6. A downhole gas separator as defined in claim 5, wherein the desander body seal is a generally cup-shaped seal which extends radially outward and upward from the tubular body.

7. A downhole gas separator as defined in claim 1, further comprising:
a generally tubular desander body positioned below and in fluid communication with the tubular body; and
a seal supported on the desander body for substantially sealing an annulus between an interior of a casing and an exterior of the desander body, thereby trapping gas below the seal.

8. A downhole gas separator as defined in claim 1, further comprising:
the tubular body having one or more flow ports for passing fluid to one or more vortex bodies.

9. A downhole gas separator for separating gas from downhole formation fluids prior to pumping the formation fluids to the surface, comprising:
a generally tubular body having a fluid inlet for receiving formation fluid from a producing formation to a wellbore;
a seal supported on the tubular body for substantially sealing an annulus between an interior of a casing and an exterior of the tubular gas separator body, thereby trapping gas below the seal;
one or more flow ports through the tubular body and spaced above the seal for passing downhole fluids from the flow inlet to the annulus and then to a fluid pump;
an elongate tube having a lower end in fluid communication with the annulus below the seal and an upper end spaced above the lower end for exhausting gas;
a generally tubular desander body positioned below and in fluid communication with the tubular body; and
a desander body seal supported on the desander body for substantially sealing an annulus between an interior of a casing and an exterior of the desander body, thereby trapping gas below the desander body seal.

10. A downhole gas separator as defined in claim 9, wherein the desander body seal is a generally cup-shaped seal which extends radially outward and upward from the tubular body.

11. A downhole gas separator as defined in claim 9, further comprising:
a strainer positioned upstream from the lower end of the elongate tube for preventing debris from entering the elongate tube.

12. A downhole gas separator as defined in claim 9, further comprising:
a generally sleeve-shaped vortex body positioned within a desander body, the vortex body having a frustoconical interior surface with a vortex body axis substantially aligned with the desander body axis and containing one or more substantially tangential inlet ports for imparting a vortex flow to the fluid within the vortex body.

13. A downhole gas separator for separating gas from downhole formation fluids prior to pumping the formation fluids to the surface, comprising:
a generally tubular body having a fluid inlet for receiving formation fluid from a producing formation to a wellbore;
a seal supported on the tubular body for substantially sealing an annulus between an interior of a casing and an exterior of the tubular gas separator body, thereby trapping gas below the seal;
one or more flow ports through the tubular body and spaced above the seal for passing downhole fluids from the flow inlet to the annulus and then to a fluid pump; and
an elongate tube having a lower end in fluid communication with the annulus below the seal and an upper end spaced above the lower end for exhausting gas from below the seal to above the seal.

14. A downhole gas separator as defined in claim 13, further comprising:
a strainer positioned upstream from the lower end of the elongate tube for preventing debris from entering the elongate tube.

15. A downhole gas separator as defined in claim 13, wherein the seal is a generally cup-shaped seal which extends radially outward and downward from the tubular body.

16. A downhole gas separator as defined in claim 13, further comprising:
a generally tubular desander body having a desander body axis, the desander body for receiving the downhole formation fluids therein; and
a generally sleeve-shaped vortex body positioned within a desander body, the vortex body having a frustoconical interior surface with a vortex body axis substantially aligned with the desander body axis and containing one or more substantially tangential inlet ports for imparting a vortex flow to the fluid within the vortex body.

17. A downhole gas separator as defined in claim 16, further comprising:
a desander body seal supported on the desander body for substantially sealing between an exterior surface of the desander body and an interior surface of a downhole casing.

18. A downhole gas separator as defined in claim 16, further comprising:
the tubular desander body having one or more flow ports for passing fluid to the vortex body.

* * * * *